(12) United States Patent
Schmid

(10) Patent No.: US 7,206,664 B2
(45) Date of Patent: Apr. 17, 2007

(54) DEVICE AND METHOD FOR MIXING SUBSTANCES

(75) Inventor: Johannes Schmid, Wolfhausen (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 10/656,141

(22) Filed: Sep. 8, 2003

(65) Prior Publication Data

US 2004/0133306 A1    Jul. 8, 2004

Related U.S. Application Data

(63) Continuation of application No. PCT/IB02/00650, filed on Mar. 6, 2002.

(30) Foreign Application Priority Data

Mar. 9, 2001    (DE)    ................. 101 11 730

(51) Int. Cl.
  *G06F 17/00*    (2006.01)
(52) U.S. Cl. .................... 700/239; 700/241
(58) Field of Classification Search ............... 700/239, 700/240, 241, 265
See application file for complete search history.

(56) References Cited

U.S. PATENT DOCUMENTS

| | | | | |
|---|---|---|---|---|
| 4,403,866 A | * | 9/1983 | Falcoff et al. ............... | 366/132 |
| 4,766,548 A | | 8/1988 | Cedrone et al. | |
| 5,078,302 A | * | 1/1992 | Hellenberg ................ | 222/144 |
| 5,153,825 A | | 10/1992 | Yauk et al. | |
| 5,163,010 A | * | 11/1992 | Klein et al. ................. | 700/239 |
| 5,460,297 A | * | 10/1995 | Shannon et al. ............ | 222/135 |
| 5,718,268 A | | 2/1998 | Muscara | |
| 5,785,960 A | * | 7/1998 | Rigg et al. .................... | 424/63 |
| 5,797,750 A | * | 8/1998 | Gouriou et al. ............. | 434/100 |

(Continued)

FOREIGN PATENT DOCUMENTS

DE    198 54 651 C1    5/2000

(Continued)

OTHER PUBLICATIONS

Jerry D. Gibson, The Mobile Communications Handbook, 2nd Edition, CRC Press, Boca Raton 1999, Chapter 32, pp. 32-1 to 32-14.

(Continued)

*Primary Examiner*—Khoi H. Tran
(74) *Attorney, Agent, or Firm*—Buchanan Ingersoll & Rooney PC

(57) ABSTRACT

The device, which serves to mix substances, especially coloring substances, has a processor unit, a local memory unit for storing mixing formulas, a display unit, and an input unit, as well as a measuring device, in particular a scale, with which portions of substances in quantities determined according to a mixing formula can be filled manually or automatically into a container. The processor unit is further connected to a communications module, with which a communications connection to a data server can be wirelessly established, via which the data of mixing formulas can be transmitted to the local memory unit. The method for operating the device therefore allows a user to call up constantly up-to-date mixing formulas directly on the mixing device and then to start a mixing process, or perform a mixing manually while observing the display of the measuring device.

18 Claims, 2 Drawing Sheets

U.S. PATENT DOCUMENTS

| | | | |
|---|---|---|---|
| 5,903,465 A * | 5/1999 | Brown | 700/242 |
| 5,905,719 A | 5/1999 | Arnold et al. | |
| 5,938,080 A * | 8/1999 | Haaser et al. | 222/144 |
| 6,177,093 B1 * | 1/2001 | Lombardi et al. | 424/401 |
| 6,437,866 B1 * | 8/2002 | Flynn | 356/402 |
| 6,510,366 B1 * | 1/2003 | Murray et al. | 700/239 |
| 6,516,245 B1 * | 2/2003 | Dirksing et al. | 700/233 |
| 6,543,490 B1 * | 4/2003 | Owens | 141/20 |
| 6,622,064 B2 * | 9/2003 | Bartholomew et al. | 700/233 |
| 6,701,977 B2 * | 3/2004 | Taylor et al. | 141/83 |
| 6,763,860 B2 * | 7/2004 | Jungmann et al. | 141/104 |
| 6,793,387 B1 * | 9/2004 | Neas et al. | 366/160.4 |
| 6,957,125 B1 * | 10/2005 | Rifkin | 700/232 |

FOREIGN PATENT DOCUMENTS

| | | |
|---|---|---|
| EP | 0 484 564 A1 | 5/1992 |
| WO | 98/30189 | 7/1998 |
| WO | WO 00/68137 A1 | 11/2000 |
| WO | 01/91600 A2 | 12/2001 |
| WO | 01/91601 A2 | 12/2001 |

OTHER PUBLICATIONS

Bluetooth Protocol Architecture, see Bluetooth White Paper, Bluetooth Protocol Architecture, Version 1.0, published on Aug. 25, 1999, by the Special Interest Group (SIG) (see www.bluetooth.com)).

J. Bray, F. Sturman, Bluetooth: Connect Without Cables, Prentice Hall Inc., New York 2001, Chapter 1 (Overview), pp. 7-9.

B. Walke, Mobilfunknetze und ihre Protokolle, vol. 2, B. G. Teubner Verlag, Stuttgart 2000, chapter 10, pp. 107-122 and pp. 327-335 [*German edition of Mobile Radio Networks: Networking and Protocols*, John Wiley & Sons, New York, 1999].

B. Walke, Mobilfunknetze und ihre Protokolle, vol. 1, B. G. Teubner Verlag, Stuttgart 2000, Chapter 3, pp. 135-194 and [*Chapter 3.10*, pp. 272-283—*German edition of Mobile Radio Networks: Networking and Protocols*, John Wiley & Sons, New York, 1999]).

R. Sellin, Neue mobile Perspektiven mit WAP und GPRS, [*New Mobile Perspectives with WAP and GPRS: article in German only in*] Der Fernmeldeingenieur, Verlag für Wissenschaft und Leben, Georg Heidecker GmbH, Heft 5/'00, Erlangen 2000, p. 14.

* cited by examiner

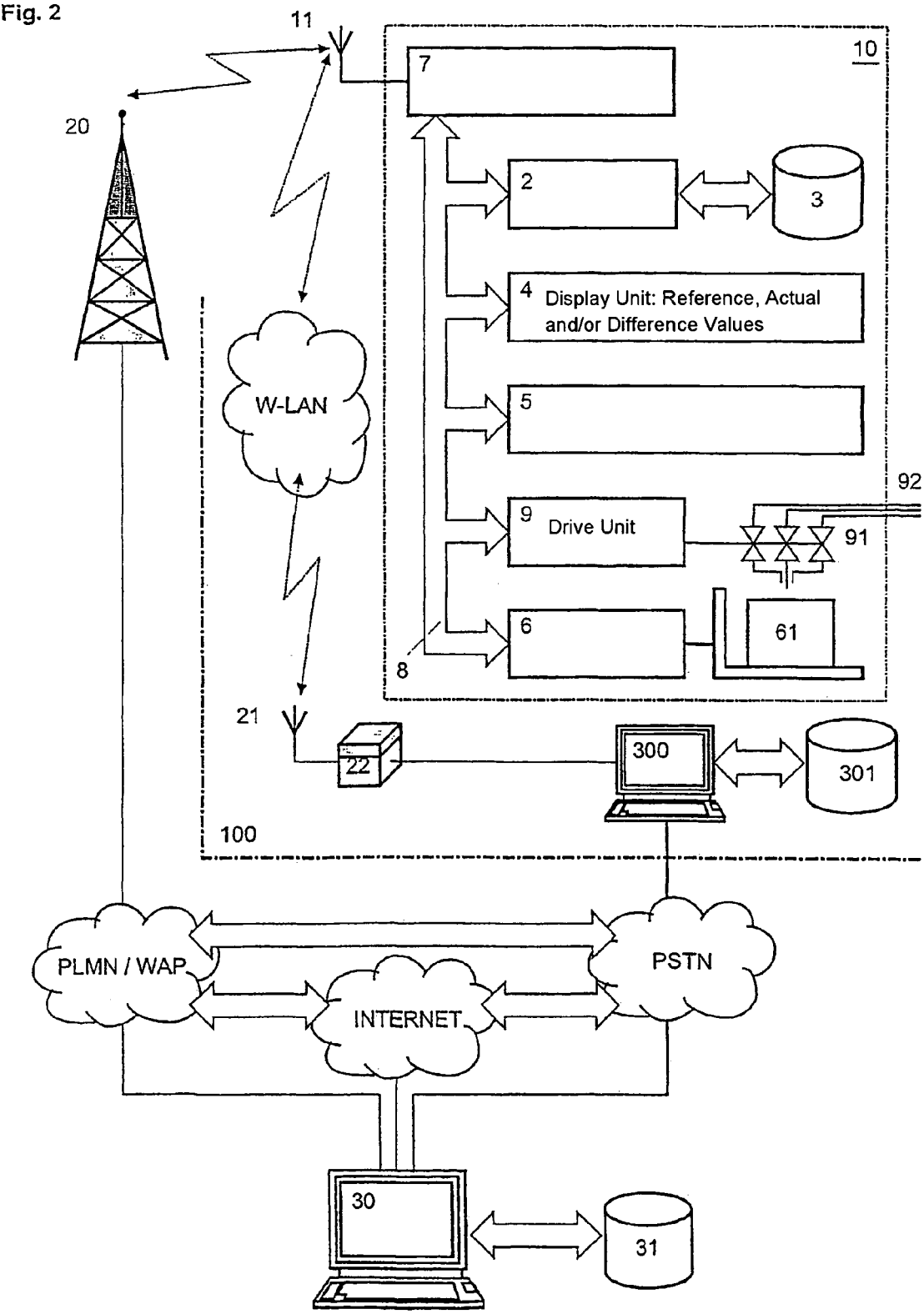

DEVICE AND METHOD FOR MIXING SUBSTANCES

CROSS-REFERENCE TO RELATED APPLICATIONS

This application claims priority under 35 U.S.C. §119 to German Application 10111730.2 filed in Germany on 9 Mar. 2001, and is a continuation application under 35 U.S.C. §120 of PCT/IB02/00650, designating the United States, filed 6 Mar. 2002, both of which are incorporated herein by reference.

BACKGROUND

The invention relates to a device and a method for mixing solid, powdery, and/or liquid substances, such as coloring substances.

Commercially available coloring substances consist of pigmented liquids which, after application to a body, transform into a thin, normally opaque, film. The liquids contain resins, solvents, pigments, and if need be further additives, which affect the properties of the coloring substance. The resin determines the strength of the resulting film after the solvent has dried. The pigmentation determines the hue of the coloring substance.

The hue resulting from the mixing of coloring substances results from the subtraction of the individual hues from white light. Consequently, the proportions of individual coloring substances which are specified in a mixing formula determine the hue of the resulting mixture. If mixing does not take place exactly according to the mixing formula, a deviation from the desired hue results, which is especially troublesome if a body which was coated in original hue in some places is to be newly painted or lacquered.

It is known from U.S. Pat. No. 5,153,825, columns 1 and 2, that paint manufacturers give microfiche lists containing mixing formulas to customers who visualize the sought mixing formulas by means of projectors, note the formulas, for example, on a piece of paper, and then in a laboratory or workshop assemble the specified mixture.

Interpretation of the specified mixing formula, which may be formatted in manufacturer-specific manner, and copying it onto a piece of paper, is time-consuming and often subject to error. Furthermore, if the quantities to be produced in the mixing process are not standard quantities, conversions may be necessary.

For this reason, in U.S. Pat. No. 5,153,825, column 2, a computer system is proposed which allows mixing formulas and associated numbers to be called up and, by means of a printer, printed on, for example, labels. The system further allows the calculation of portions for mixing a non-standardly specified quantity. At the same time, the system serves to perform cost calculations and monitor the inventory (see also U.S. Pat. No. 5,153,825, FIG. 1).

It is known from U.S. Pat. No. 5,718,268, that liquids can be filled into containers in accurately measured quantities. Use can be made of scales which allow the filled quantity to be measured accurately. In this manner, the portions required for a mixed product can be accurately measured out.

The computer system described in U.S. Pat. No. 5,153,825, column 2, allows the user to conveniently call up, calculate, and print out data of a mixing formula. The data obtained are entered into a measuring device, such as a computer-controlled scale, after which the corresponding substances can be manually filled into a mixing container. Further possible is the use of a mixing robot provided with a measuring device, for example the device according to U.S. Pat. No. 5,718,268, which, after the data have been entered, automatically fills the substances in the specified proportions into a mixing container.

Use of the described computer system for mixing substances can be associated with substantial effort, which can be particularly caused by the selection and/or printing of the data, transfer of the data from the computer system to the measuring and/or mixing device, and entering the data into the measuring and/or mixing device. Furthermore, incorrect entry of the mixing formula can result in faulty mixed products.

SUMMARY

A device is disclosed for mixing substances, especially coloring substances, which can be operated in simple manner and practically free of error. A corresponding method of operating this device shall also be expounded.

An exemplary device which is suitable for mixing substances, especially coloring substances, has a processor unit which is connected to a memory unit which serves to store mixing formulas, and to a measuring device with which substances can be filled manually or automatically into a container in proportions which are specified in a mixing formula called up from the memory unit. The mixing formula possibly contains further information such as notes on the use of the mixed substances, operating instructions, operating programs, or suchlike.

The processor unit is further connected to a communication module, by means of which wireless communication to a remote data server can be established, so that either regularly or when required, updating of the mixing formulas and/or data in the memory unit belonging to the device takes place. Updating of the data can be controlled by the user, or automatic, or initiated by the data server. The data server can be situated at any distance away. It can, however, also serve as an intermediate station of a local apparatus present in the plant area which itself communicates with the external server. The connection may only be maintained for a short time, so that correspondingly low communication charges are incurred.

A user can therefore call up constantly up-to-date mixing formulas directly on the mixing device and then start a mixing process, or perform a mixing manually while observing the display of the measuring device. The transmission of data to the measuring or mixing device by the user, and the associated possibilities of error, can be thereby obviated. The calculation of mixing portions for freely selectable quantities of mixed products can be performed automatically by the processor unit.

An exemplary mixing device which can be manufactured inexpensively and operated with relatively little effort without additional auxiliary aids, therefore can have available an up-to-date data status. Furthermore, with the assistance of the mixing device, mixing and filling processes can be automated in simple manner, as a result of which the operating costs can be reduced further.

BRIEF DESCRIPTION OF THE DRAWINGS

Exemplary embodiments are explained in greater detail below by reference to drawings.

FIG. 2 shows an exemplary device suitable for automated mixing of substances.

DETAILED DESCRIPTION OF THE PREFERRED EMBODIMENTS

Figure 1:
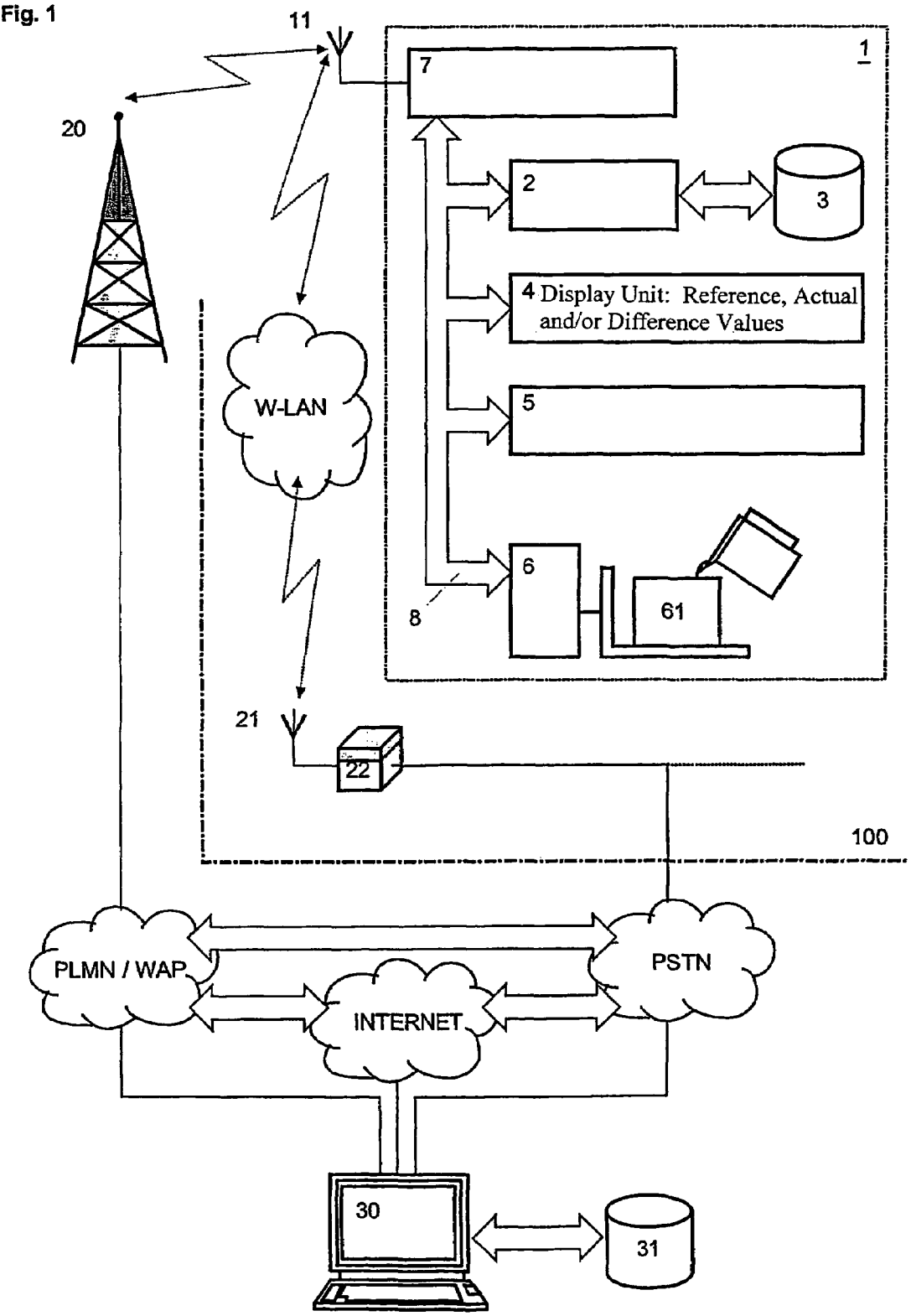
FIG. 1 shows an exemplary device for manually mixing substances, which is wirelessly connected to an external data server.

FIG. 1 shows a device which is suitable for mixing substances, such as coloring substances, and which is referred to hereafter as mixing device 1. The mixing device 1, which is normally installed inside a working area 100, has a processor unit 2, which is connected via a bus system 8 to a local memory-unit 3, to a display unit 4, to an input unit 5, to a communications module 7, and to a measuring device 6, with which portions of substances in specified quantities can be filled into a container 61. The quantities of the individual mixing portions can be specified in mixing formulas which can be called up from the local memory unit 3.

From U.S. Pat. No. 5,718,268, column 1, it is known that for the measured filling of liquids, various measuring methods can be used. The filling level can be determined by, for example, an optical measurement or an ultrasonic measurement. The weight of the quantities filled into the container 61, as shown in FIG. 1, can be measured by means of a measuring device 6 in the form of a scale.

For this purpose, the specified weight and the actual weight, or a remaining difference, of a component to be mixed can be visualized on the display unit 4, so that the user can precisely fill the required quantity into the container 61. Attainment of the specified quantity while the substances are being filled can therefore be signaled to the user optically on the display unit 4, or acoustically.

The communications module 7, which is provided with an antenna 11, serves the creation of wireless connections to an external data server 30, from whose memory unit 31 data of mixing formulas can be transmitted to the local memory unit 3, so that the data of the mixing device, especially the mixing formulas, and any notes regarding manufacture and use of the mixture, if need be also operating programs, can always be kept at the up-to-date status. The use of an additional computer system, and other transfer of data, can be therefore obviated.

Connections to the external data server 30 can be established via a local W-LAN radio network, and/or via a public switched telephone network (PSTN), for example ISDN (Integrated Services Digital Network). In particular, however, the device has the possibility of creating a connection directly via a Public Land Mobile Network (PLMN) which is based on, for example, the GSM or UMTS specifications, and can support the Wireless Application Protocol (WAP).

The connection to the external data server 30 can, as shown in FIG. 2, take place via a local data server 300 which, for example, serves as a data buffer. Current data is, for example, transmitted from the external data server 30 to the local data server 300, and subsequently from there via a wireless local network W-LAN to one or more mixing devices 10. Such a buffer can, for example, be practical in association with an inventory management if for example, after a mixing recipe is modified by the supplier, the plant first continues to use the former mixing formula and changes when the inventories are exhausted.

Principles of wireless local area networks (W-LAN) are described in, for example, Jerry D. Gibson, The Mobile Communications Handbook, 2nd Edition, CRC Press, Boca Raton 1999, Chapter 32, pages 32-1 to 32-14. Shown on page 32-2 in FIG. 32.1 are several portable computer systems which form a wireless ad-hoc-network.

Wireless local ad-hoc networks can be based on, for example, the Bluetooth Protocol Architecture, which was defined by the Bluetooth Special Interest Group (see Bluetooth White Paper, Bluetooth Protocol Architecture, Version. 1.0, published on Aug. 25, 1999, by the Special Interest Group (SIG) (see www.bluetooth.com)). Ad-hoc networks allow the establishment of master-slave and/or client-server connections between different network units. The establishment of point-point or point-multipoint connections as described in J. Bray, F. Sturman, Bluetooth: Connect Without Cables, Prentice Hall Inc., New York 2001, Chapter 1 (Overview), pages 7–9, is possible.

In consequence, one or more mixing devices 1 which have communications modules 7 operating according to the Bluetooth Specifications, can communicate with a local data server 300 (see FIG. 2), which is itself connected via a mobile radio network PLMN or fixed-line network PSTN, and if need be also via the Internet, to an external data server 30. The communication can, however, also take place by other means as described further below.

Further wireless local networks W-LAN are described in B. Walke, Mobilfunknetze und ihre Protokolle, Volume 2, B. G. Teubner Verlag, Stuttgart 2000, chapter 10, pages 327–335 *[German edition of Mobile Radio Networks: Networking and Protocols*, John Wiley & Sons, New York, 1999].

Also possible is the use of a communications network operating according to Digital Enhanced Cordless Communications (DECT) technology. DECT technology and possibilities for the realization of DECT systems are described in B. Walke, Mobilfunknetze und ihre Protokolle, Volume 2, B. G. Teubner Verlag, Stuttgart 2000, chapter 10, on pages 107–122. From FIGS. 5.13, 5.14, and 5.15 it can be seen that cordless end-devices which operate according to the DECT standard can be coupled to a public fixed-line network ISDN/PSTN or a mobile radio network PLMN/GSM.

Mixing devices 1 can therefore be advantageously integrated into existing wireless local networks (W-LANs). If, for example in smaller companies, no wireless local network W-LAN is present or being established, the connection from the communications module 7 takes place directly to a public mobile radio network PLMN, which operates, for example, according to the GSM standards (see, B. Walke, Mobilfunknetze und ihre Protokolle, Volume 1, B. G. Teubner Verlag, Stuttgart 2000, Chapter 3, pages 135–194 *[German edition of Mobile Radio Networks: Networking and Protocols*, John Wiley & Sons, New York, 1999]). A local data server 300 can also be addressed in this way, either by being—as shown in FIG. 2—connected to the fixed-line network PSTN and therefore connected to the PLMN, or by itself containing—which is not shown in the drawing—a mobile radio communications module and being connected to the PLMN via the antenna 21 and the antenna 20.

In B. Walke, Mobilfunknetze und ihre Protokolle, Volume 1, B. G. Teubner Verlag, Stuttgart 2000, Chapter 3.10, pages 272–283, services of a GSM mobile radio network PLMN are described which are suitable for the transmission of data. The bearer services allow the bit-transparent transmission of data by means of call-oriented channel- or packet-switching data transmission on a transmission system which is defined according to the bottom three layers of the ISO/OSI model.

In this case, transmission of the data can be controlled via the upper protocol layers by means of the application programs provided in the mixing device 1 and in the external data server 30.

The connection to the external data server 30 can take place via the Internet. As shown in R. Sellin, Neue mobile Perspektiven mit WAP und GPRS, [New Mobile Perspectives with WAP and GPRS: article in German only in] Der Fernmeldeingenieur, Verlag für Wissenschaft und Leben, Georg Heidecker GmbH, Heft 5/'00, Erlangen 2000, page 14, the protocols of the Wireless Application Protocol (WAP) can also be superimposed on the bearer services of the mobile radio networks PLMN (for example, GSM, GPRS, CDMA, PHS, etc.), by means of which a mobile radio end-device or a WAP handheld device, as shown in R. Sellin, Neue mobile Perspektiven mit WAP und GPRS, [*New Mobile Perspectives with WAP and GPRS: article in German only in*] Der Fernmeldeingenieur, Verlag für Wissenschaft und Leben, Georg Heidecker GmbH, Heft 5/'00, Erlangen 2000, page 10, FIG. 2, can establish a client-server connection to a web-server provided on the Internet and obtain data (content) from it.

A General Packet Radio Service (GPRS) network structure and the construction of a virtual private network by means of GPRS is described in R. Sellin, Neue mobile Perspektiven mit WAP und GPRS, [New Mobile Perspectives with WAP and GPRS: article in German only in] Der Fernmeldeingenieur, Verlag für Wissenschaft und Leben, Georg Heidecker GmbH, Heft 5/'00, Erlangen 2000, pages 21–27. Further methods and devices for wireless Internet access are described in, for example, U.S. Pat. No. 5,905,719.

The communications module 7 therefore can operate according to the respective specifications and/or protocols of the land-based or satellite-supported mobile radio systems such as UMTS and GSM, as far as possible with superimposed WAP, and/or at least one protocol for a W-LAN, especially according to the DECT or Bluetooth specifications. In FIG. 1 it is shown that the connection takes place via radio from the antenna 11 of the communications module 7 to the antenna 20 of a base station of the cellular network GSM/UMTS or to an antenna 21 of the wireless local network W-LAN, which is connected via an interface module 22 to the public communications network PSTN, and/or to the mobile network GSM/UMTS.

The communications connection between the communications module 7 and the assigned external data server 30 can be established regularly or according to need. Each time after the connection is established, the up-to-date data of mixing formulas are transmitted to the local memory unit 3. The data of mixing formulas can additionally contain operating instructions, operating programs for the automatic mixing, notes regarding use of the mixed substances, and suchlike.

By means of the transmitted data, in the local memory unit 3, for example, new mixing formulas are added, existing mixing formulas modified and/or replaced. The operating programs can also be updated via the wireless connections described.

Updating of the data in the local memory unit 3 takes place, for example, before the start, or after the end, of the mixing process, at predefined fixed or at selectable time intervals, manually controlled according to need or initiated by an internal or external data server 300, 30, should this be necessary after a revision of the internal or external database 301, 31.

Furthermore, in the external data server 30 the date, or/and a corresponding number of the data version, can be stored which is/are used in the associated mixing devices 1. Upon a change of version, the external data server 30 can update its clients correspondingly. Also possible is storage of the version information in the mixing devices 1, which by periodic interrogation of the external data server 30 can determine whether their status is up-to-date. Mixing formulas, whose status is therefore always up-to-date, can by means of the input unit 5 be selected and called up from the local memory unit 3, so that the mixing operation can be performed manually or automatically.

FIG. 2 shows a device 10 suitable for automated mixing of substances in that the processor unit 2 is additionally connected to a drive module 9, with which valves 91 of supply pipes 92 can be controlled. The valves 91 can be controlled by the processor unit 2 in such manner that portions of the substances to be mixed corresponding to the quantities specified in the selected mixing formulas can be filled into the container 61.

For this purpose, the processor unit 2 compares a reference value of a substance to be mixed which is contained in a selected mixing formula with the actual value measured by the scale 6 and, depending on the comparison, controls the supply of the substance to be mixed. The valves 91 are controlled sequentially in such manner that each substance is filled into the container 61 until the weight value measured and fed back for each substance by the scale 6 corresponds to the value specified in the mixing formula. In addition, the flow of the substances can be regulated depending on the filling level. Furthermore, if necessary, a further sequence can follow with the aid of which filling inaccuracies detected during the first sequence can be corrected.

The mixing device 10 can be connected via the public mobile radio network or via the local radio network W-LAN to electronic systems for inventory management and/or accounting, so that changes in the data regarding the mixing formulas, or data of completed mixing processes, can be used for inventory management and invoicing. Furthermore, the mixing device can be provided with a printer.

The mixing device 10 can be used advantageously in the chemical, pharmaceutical, and food industries. It can be used with particular advantage in plants where coloring substances or paints are only mixed in small quantities to repair damage to painted objects such as, for example, on automobiles.

The mixing device can be embodied in diverse ways. Especially advantageous is the use for the measuring device 6 of a scale into which the processor unit 2, the memory unit 3, the display unit 4, the input unit 5, and the communications module 7 are integrated: The display unit 4 and the input unit 5 can be advantageously combined into one unit, for example a touch screen.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Device for mixing substances, comprising:
   a processor unit to calculate mixing portions for freely selectable quantities of substances to be mixed;
   a local memory unit connected with the processor unit to store mixing formulas and to keep mixing formulas available for operation of the mixing device;
   a display unit and an input unit operably connected with the processor unit;
   a scale by which portions of substances in quantities determined according to a mixing formula are filled manually or automatically into a container; and a data server comprising a memory to store actual mixing formulas, wherein the processor unit is connected to a communications module for establishing a wireless communications connection to the data server for a time period, regularly or intermittently, for receiving data of up-to-date mixing formulas to control the mixing process of the substances, wherein the processor unit, the memory unit, the display unit, the input unit and the communications module are integrated into the scale.

2. Device according to claim 1, wherein the communications module operates according to at least one mobile radio protocol or/and according to at least one Wireless Local Area Network protocol, and is suitable for establishing communications connections.

3. Device according to claim 2, wherein the connection to the data server can be created wirelessly via at least one of a public radio network (PLMN), a wireless local network (W-LAN), and a public communications network (PLMN, PSTN).

4. Device according to claim 3, wherein the connection to the data server takes place via the Internet, and installed in the processor unit or in the communications module is a browser which operates using at least one of a Wireless Application Protocol (WAP) and a Hypertext Transfer Protocol (HTTP).

5. Device according to claim 1, wherein via the input unit, a mixing formula is selected and called up from the memory unit, and at least one of a specified weight value, an actual weight value, and a difference value between the specified and actual weight values is visualized on the display unit for manual addition of the substances to be mixed.

6. Device according to claim 1, comprising valves of supply pipes, wherein the processor unit acts via a drive unit on the valves of supply pipes for supplying the substances to the container.

7. Device according to claim 6, wherein, via the input unit, a mixing formula can be selected and called up from the memory unit, and via the drive unit desired quantities of the substances are filled into the container automatically.

8. Device according to claim 1, wherein the display unit and the input unit are combined into one unit.

9. Method of operating a device for mixing substances, the device comprising: a processor unit to calculate mixing portions for freely selectable quantities of substances to be mixed; a local memory unit connected with the processor unit to store mixing formulas and to keep mixing formulas available for operation of the mixing device; a display unit and an input unit operably connected with the processor unit; a scale, by which portions of substances in quantities determined according to a mixing formula are filled manually or automatically into a container; and a data server comprising a memory to store actual mixing formulas, the method comprising:
regularly or intermittently connecting a wireless communication between the device and a data server, and
receiving up-to-date data of mixing formulas for the local memory unit of the device, wherein the local memory unit keeps up-to-date mixing formulas available for operation of the mixing device, wherein the substances are coloring substances, and wherein the processor unit, the memory unit, the display unit, the input unit and a communications module are integrated into the scale.

10. Method according to claim 9, wherein the data transmitted to the local memory unit includes:
a) new mixing formulas,
b) modifications to existing mixing formulas; and/or
c) replacements for existing mixing formulas.

11. Method according to claim 9, wherein updating of mixing formula data in the local memory unit takes place:
a) before a start, or after an end, of a mixing process;
b) at predefined fixed, or at selectable time intervals;
c) in response to manual control, or;
d) in response to being initiated by the data server.

12. Method according to claim 9, wherein a mixing formula selected using the input unit is called up from the memory unit, and at least one of a specified weight value, an actual weight value, and a difference value between the specified and actual weight values is visualized on the display unit, and a desired quantity of the substance to be filled is manually filled into the container.

13. Method according to claim 9, wherein the processor unit of the device acts via a drive unit on valves of supply pipes to supply the substances to the container, and using the input unit, a mixing formula is selected and called up from the memory unit, and using the drive unit, desired quantities of the substances are filled into the container automatically.

14. Method according to claim 9, wherein via the input unit, a mixing formula is selected and called up from the memory unit, and at least one of a specified weight value, an actual weight value, and a difference value between the specified and actual weight values is visualized on the display unit for manual addition of the substances to be mixed.

15. Method according to claim 9, wherein the processor unit acts via a drive unit on valves of supply pipes for supplying the substances to the container.

16. Method according to claim 10, wherein updating of mixing formula data in the local memory unit takes place:
a) before a start, or after an end, of a mixing process;
b) at predefined fixed, or at selectable time intervals;
c) in response to manual control, or;
d) in response to being initiated by the data server.

17. Method according to claim 16, wherein a mixing formula selected using the input unit is called up from the memory unit, and at least one of a specified weight value, an actual weight value, and a difference value between the specified and actual weight values is visualized on the display unit, and a desired quantity of the substance to be filled is manually filled into the container.

18. Method according to claim 16, wherein the processor unit of the device acts via a drive unit on valves of supply pipes to supply the substances to the container, and using the input unit, a mixing formula is selected and called up from the memory unit, and using the drive unit, desired quantities of the substances are filled into the container automatically.

* * * * *